United States Patent [19]

Millar et al.

[11] Patent Number: 5,710,984
[45] Date of Patent: Jan. 20, 1998

[54] RADIO TRANSCEIVER WITH IMPEDANCE MATCHED TEST PORT

[75] Inventors: Douglas James Millar; Tatsuya Uetake; Tai Won Youn, all of Vancouver, Wash.

[73] Assignees: Sharp Microelectronics Technology, Inc., Camas, Wash.; Sharp Kabushiki Kaisha, Osaka, Japan

[21] Appl. No.: 546,175

[22] Filed: Oct. 20, 1995

[51] Int. Cl.$^6$ ............................................. H04B 1/44
[52] U.S. Cl. ............................. 455/80; 455/89; 455/90; 343/702
[58] Field of Search ......................... 455/73, 78, 80, 455/82, 83, 89, 90, 280, 289, 129, 277.1, 277.2; 343/702, 703, 901; 333/100, 101, 102, 103, 126

[56] References Cited

U.S. PATENT DOCUMENTS

| | | | |
|---|---|---|---|
| 4,862,182 | 8/1989 | Egashira | 343/702 |
| 5,138,329 | 8/1992 | Saarnimo et al. | 343/702 |
| 5,261,121 | 11/1993 | Hashimoto | 455/89 |
| 5,577,269 | 11/1996 | Ludewig | 455/89 |
| 5,584,053 | 12/1996 | Kommrusch et al. | 455/82 |

FOREIGN PATENT DOCUMENTS

| | | | |
|---|---|---|---|
| 3-184429 | 8/1991 | Japan | 455/82 |

*Primary Examiner*—Reinhard J. Eisenzopf
*Assistant Examiner*—Thanh Le
*Attorney, Agent, or Firm*—Gerald Maliszewski; David Ripma

[57] ABSTRACT

A radio transceiver is provided for wireless communications, having an interface connection that is selectable between either an antenna or a cable interface. The radio transceiver is engaged to the antenna through an impedance matching network which translates the antenna impedance to match that of the radio transceiver. The radio transceiver can, alternately, be connected to external test equipment or performance enhancement equipment through the cable interface. Since the radio transceiver has the same impedance as most external test equipment, the antenna matching network is not required or used when test equipment is connected to the cable interface. In the present invention the cable interface at least partially disconnects the matching network whenever the cable interface is in use. Once the antenna has been disconnected, the impedance of the cable interface matches that of the radio transceiver. Thus, the radio transceiver provides a convenient cable interface that matches the impedance of most test equipment, yet is easily switched to normal transmit/receive operation.

20 Claims, 4 Drawing Sheets

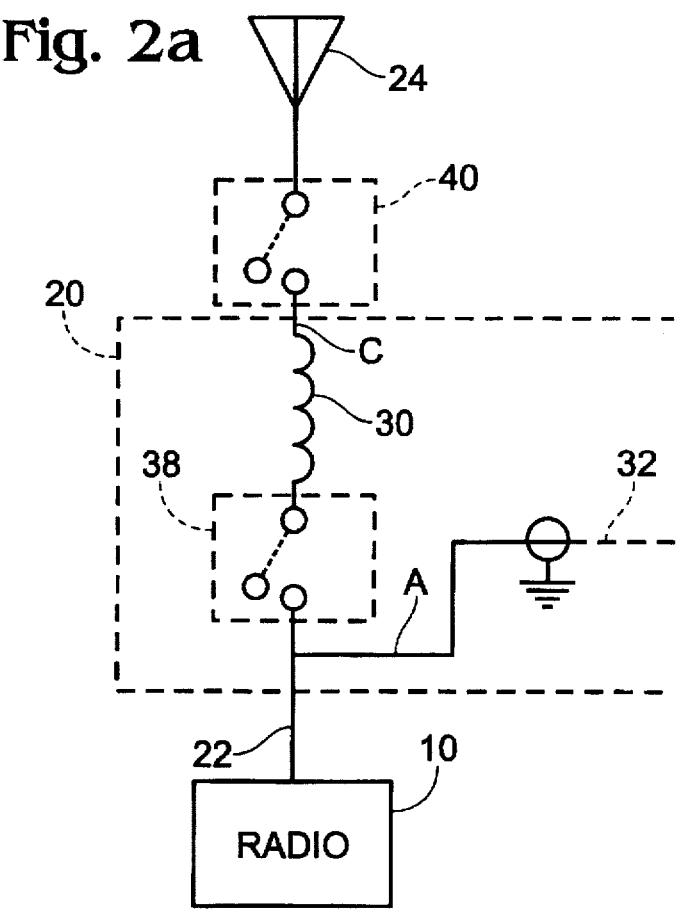
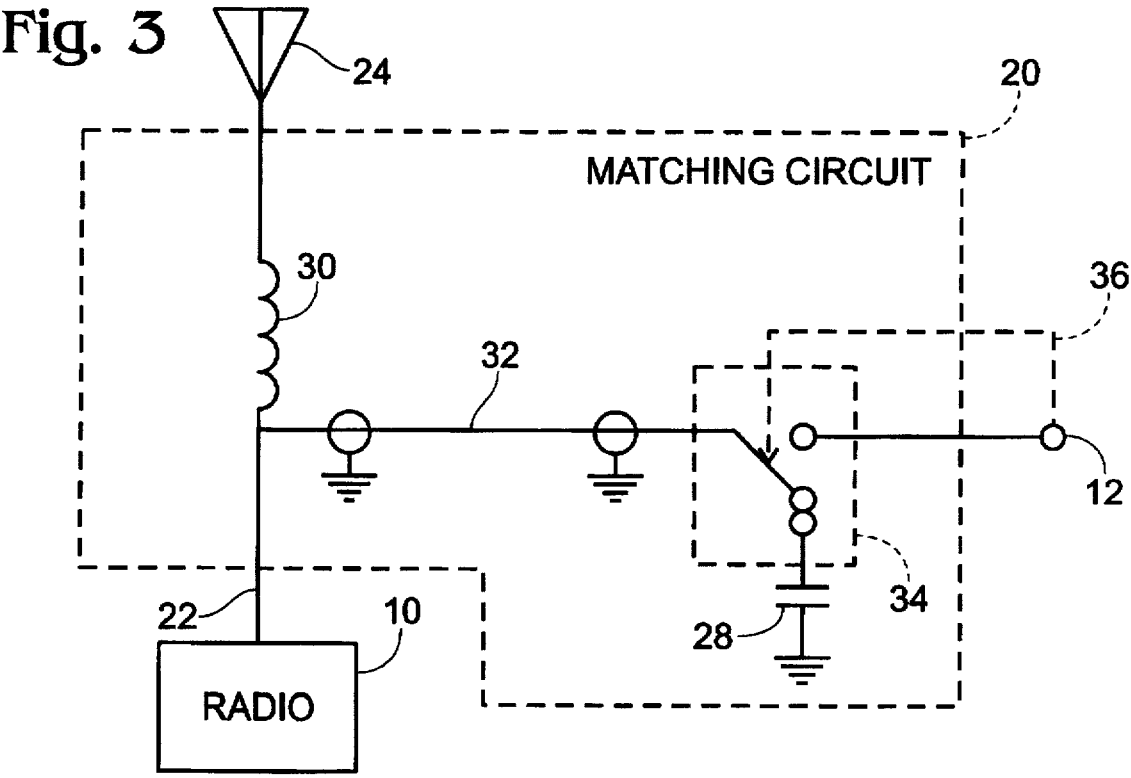

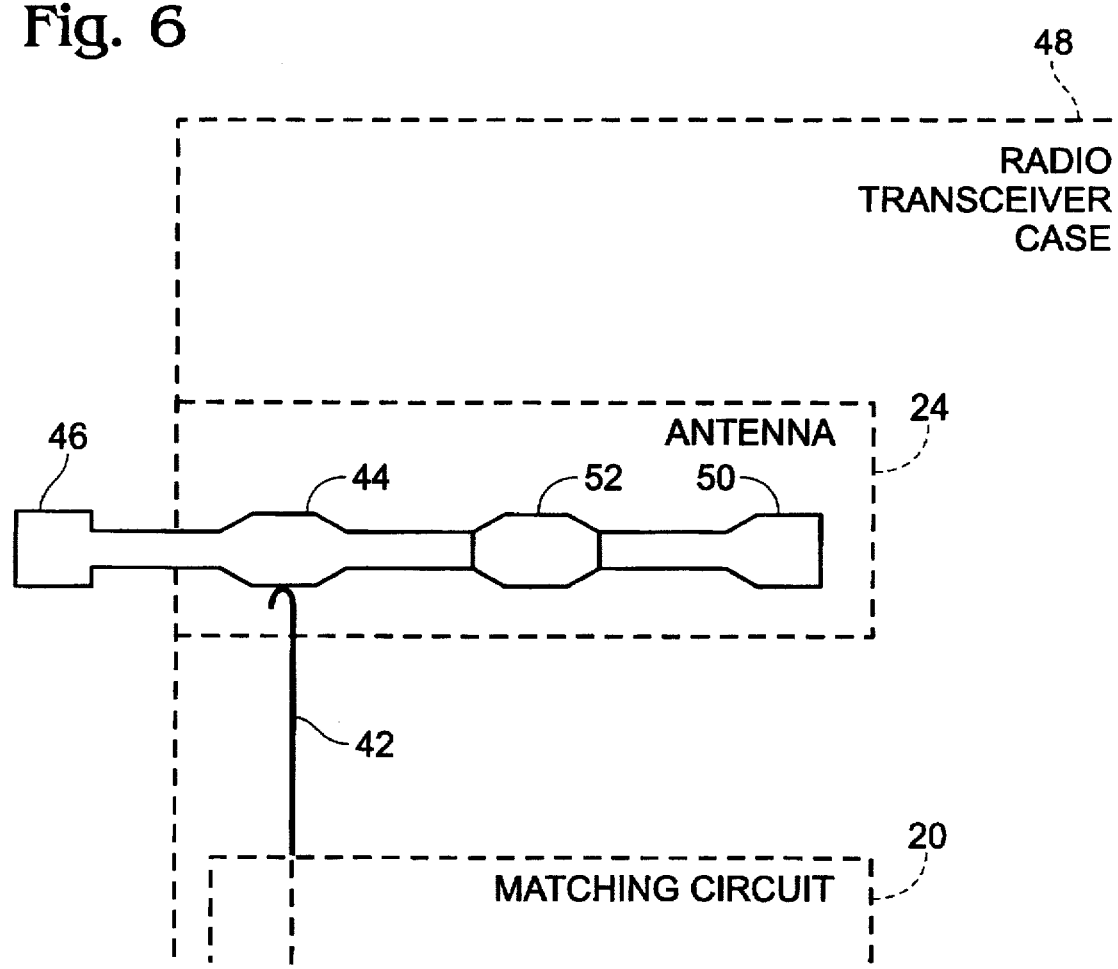

RADIO TRANSCEIVER WITH IMPEDANCE MATCHED TEST PORT

BACKGROUND AND SUMMARY OF THE INVENTION

This invention relates generally to a portable wireless communication device, and more particularly to a wireless communications device having an impedance matched test port selectively coupled to the device's antenna interconnect.

Wireless communications devices, including radios, radio transceivers, radio telephones, cellular telephones, or the like, communicate over an airlink using antennas. In the manufacture or repair of radio transceivers it is important to know if the transmitter power and receiver sensitivity meet specifications. It is desirable that these, and other, performance parameters of individual units are sampled or tested. Airlink testing of radios does not permit the accurate measurement of transmitter power or receiver sensitivity in production testing. Neither can the interface impedances of the transmitter and receiver circuits be measured when connected to an antenna. Therefore, fully assembled radios are not typically tested for these fundamental performance characteristics. If testing is done, it is done only at a sub-assembly level, or done with some disassembly of the radio.

To test transmitter power, receiver sensitivity, or circuit impedances in radio frequency (RF) communications equipment a cable or hardwire connection is usually necessary. A hardwire connection from the communications equipment to external test measurement devices is made convenient with the use of a test port on the communications device. Typically, a connector is used to mate with the test port. A suitable commercial connector for this purpose will have controlled performance specifications such as SMA, BNC, TNC, or the like, type connectors. These connector types permit a quick connection of test equipment to the test port, and repeatable measurements. The impedance of such test ports is a matter of design choice and preferably matches industry standard, 50 ohm, test equipment. Test equipment attached to a test port having a matching impedance and a known insertion loss, permits quick, simple, and accurate measurement of transmitter power, receiver sensitivity, or circuit interface impedances.

It is desirable, therefore, to build radios having the above mentioned test ports. However, the cost of a test port switch, connector, associated parts, and additional labor must be added to the total cost of the product. In addition, these parts require valuable space in small portable units.

The addition of a test port to a radio raises other problems related to manufacturing test and radio performance. Antennas are typically mounted on the top of the radio case for maximum antenna gain and user convenience. For ease of manufacturing test a test port is preferably mounted on the bottom of the case where other external radio connectors are typically found. For the same reason, it is also convenient to mount a test port switch at the bottom of the case. However, the amount of cable needed to connect the radio's antenna interconnect to the switch at the bottom of the case, and then connect the switch to the antenna at the top of the case degrades radio performance by adding insertion loss in the path between the radio's antenna interconnect and the antenna.

The problem of building a portable radio with both a test port and an antenna is further compounded by the fact that commercially available antennas do not typically have an impedance of 50 ohms. A radio with a 50 ohm test port is relatively easy to make using a 50 ohm antenna and a radio frequency (RF) switch. The output of the radio can be switched to either the antenna or the test port. Since all the impedances are 50 ohms, impedance matching issues are resolved. However, the RF switch adds at least some insertion loss in the path between the radio's antenna interconnect and the antenna. In addition, 50 ohm antennas are non-standard and, therefore, costly. RF switches are also relatively costly. Finally, the RF switch is preferably controlled by the connection of an external device to the test port. If the switch is enabled by the connection of an external device to the test port, the test port, switch, and antenna must be located near each other, which is inconvenient for factory test.

Hashimoto, U.S. Pat. No. 5,261,121, discloses a radio transceiver connected, through a RF switch, to two alternate antenna ports. The RF switch adds to the cost of the unit, and the insertion loss of the switch adds at least some degree of attenuation between the radio and the antenna which degrades both receiver and transmitter performance.

Saarnimo et al., U.S. Pat. No. 5,138,329, disclose a portable radio transceiver design for connecting the radio, through a switch, to either an antenna extended from the case, or an internal antenna. Although suitable for portable radios, the switch still adds cost and some degree of insertion loss in the path between the radio and the antenna. Also, there is no disclosure made for interfacing the radio to a 50 ohm test port.

Egashira, U.S. Pat. No. 4,862,182, discloses a radio transceiver with a matching circuit that permits the radio transceiver to be matched to an antenna in either its retracted or extended position. The patent discloses a low insertion loss antenna switch, but includes no provision for a 50 ohm test port.

It would be advantageous if a radio transceiver could provide a 50 ohm port for test, or the addition of performance enhancement options, without degrading the normal operation of the radio by adding insertion loss in the path between the radio antenna interconnect and the antenna.

It would also be advantageous if the radio transceiver could operate with commercially available antennas which typically have an impedance other than 50 ohms. Further, it would be advantageous if the radio transceiver could operate with a retractable, or multiple position, antenna.

It would be advantageous if the connection of external devices to the test port would at least partially disconnect the antenna matching circuit from the radio to create a 50 ohm impedance at the test port. Further, it would be advantageous if the disconnection of the antenna from the radio could disable any matching circuitry remaining after the external device is attached to the test port.

Accordingly, a radio transceiver is provided for sending and receiving signals. The transceiver includes an antenna interconnect having a first impedance. The radio transceiver comprises a selectively enabled matching circuit that is operatively connected to the antenna interconnect for transforming the impedance of an external antenna having a second impedance to match the first impedance. A test port is operatively connected to the antenna interconnect, and at least a first tuning element is operatively connected to the matching circuit to enable the matching circuit when no external device is connected to the test port. The first tuning element is operatively disconnected from the matching circuit to disable the matching circuit when an external device is connected to the test port. The impedance of the test port is matched to the first impedance whenever the matching circuit is disabled, whereby external devices having impedances that match the first impedance are selectively connectable to the test port.

The uniquely configured matching circuit of the present invention permits a test port, or user port, to be added to a radio transceiver as an alternate to the antenna connection. The matching circuit is designed to provide minimum insertion loss and optimal impedance matching between the radio antenna interconnect, which has a first predetermined impedance, and the antenna, which has an impedance different than the first impedance. Yet, the matching circuit can be easily disconnected when a direct connection between the radio antenna interconnect and an external test device is desired.

In its preferred form, the matching circuit of the present invention can be at least partially disconnected by inserting the external device connector into the test port. A conductor, connecting the matching circuit to a tuning element near the test port, permits the matching circuit to be tuned by an element that is easily disconnected through a linkage to the test port when the test port is engaged by an external device. In the preferred form of the invention the electrical length of the conductor is half a wavelength. An electrical length of half a wavelength allows the remotely located tuning element to be tuned as if proximately located.

In its preferred form, a capacitor is used as the tuning element in close proximity to the test port in the present invention. An inductor, in series between the radio and the antenna, is also used in the present invention as part of the matching circuit. The series matching element can effectively be removed from the matching circuit by simply disconnecting the antenna from the radio. The test port impedance provided by disconnecting the inductor from the radio antenna interconnect being substantially the same as simply removing the antenna from the inductor. Disconnecting the antenna is relatively easy since it can be made a connectorized interface on the outside of the radio case. In a first embodiment of the invention the test port is connected to the radio with a conductor having a characteristic impedance. In an alternate embodiment of the invention the test port is disconnected with a switch when the antenna is used and the matching circuit is enabled.

Another alternate embodiment of the present invention allows the radio to be connected in parallel to both the matching circuit and the test port. As in the first embodiment, the matching circuit must be disconnected, or disabled, to provide a 50 ohm test port impedance connection to the radio.

BRIEF DESCRIPTION OF THE DRAWINGS

FIG. 2a is a schematic drawing of the matching circuit of FIG. 2, in which the inductor and antenna connections are depicted in greater detail.

FIG. 3 is a schematic drawing of an alternate embodiment of the matching circuit of FIG. 2, in which the test port is selectively connected to the radio antenna interconnect through a switch.

FIG. 6 shows the radio transceiver with a test port of the present invention as in FIG. 1, including a more detailed depiction of an antenna having selectable orientations.

DETAILED DESCRIPTION OF THE PREFERRED EMBODIMENT

Figure 1:
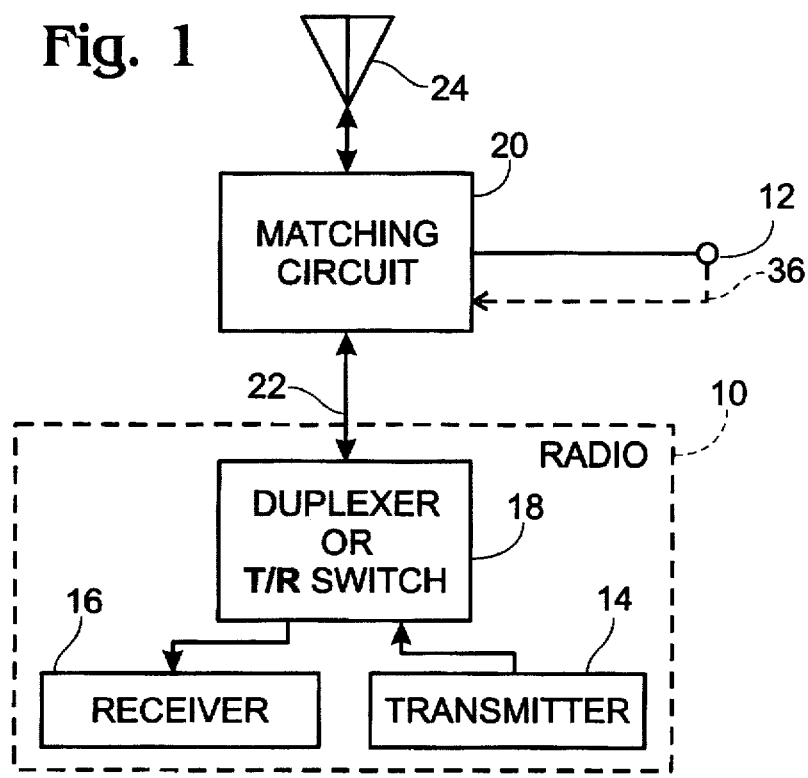
FIG. 1 is a block diagram of a radio transceiver with a test port as employed in the present invention.

FIG. 1 is a block diagram of a radio, or radio transceiver 10 with a test port 12. Radio 10 typically includes a transmitter 14 to create a signal for radiation, and a receiver 16 to accept and process received signals. Transmitter 14 and receiver 16 circuits are typically interfaced through a duplexer or transmit/receive (T/R) switch 18. When element 18 is a duplexer 18, both transmitter 14 and receiver 16 circuits operate simultaneously at different operating frequencies. Alternately, when element 18 is a T/R switch 18, transmitter 14 and receiver 16 share the same frequency but operate at different times. For convenience the element 18 will hereinafter be referred to as duplexer 18. As further alternative, duplexer 18 may permit receiver 16 and transmitter 14 to operate at different times and different frequencies.

Figure 2:
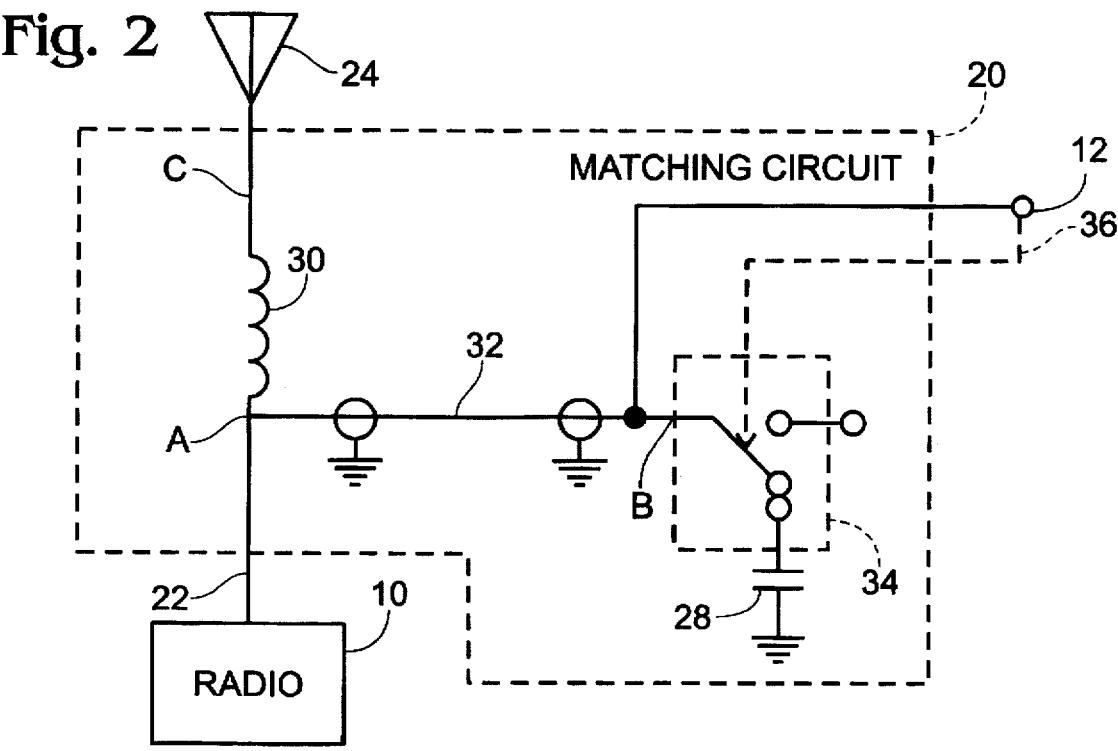
FIG. 2 is a schematic drawing of a matching circuit used in the radio transceiver with a test port of FIG. 1.

The output impedance of radio 10, referred to herein as the first impedance, is typically 50 ohms to match the impedance of standard test equipment. To minimize insertion loss, or maximize the transfer of energy from radio 10 to other circuits not having a 50 ohm impedance, a matching circuit 20 is used. The interface between radio 10 and external devices is schematically depicted in FIG. 2 as an antenna interconnect line 22, which is a line for carrying electrical signals to and from radio 10. In normal applications radio 10 is interfaced with an external antenna 24 that has a second impedance which is different from the 50 ohm impedance of antenna interconnect 22. When matching circuit 20 is enabled, it transforms the impedance of antenna 24, referred to herein as the second impedance, to match the 50 ohm impedance of the antenna interconnect 22. The present invention specifically describes a 50 ohm impedance system, but it is also suitable for use in systems with other impedances.

It is well understood in RF electronics that a "L" type matching circuit, including a capacitor 28 and an inductor 30, transforms impedances. Capacitor 28 is operatively connected to antenna interconnect 22 to provide a shunt impedance to either a ground or an ac reference voltage. Inductor 30 provides a series impedance between antenna interconnect 22 and antenna 24. The impedance transformation process steps a circuit impedance from one value to a second, different, value. In the preferred embodiment of the present invention first tuning element 28 and second tuning element 30 transform the impedance of antenna 24 to an impedance of 50 ohms for an optimal interface to antenna interconnect 22. Matching circuit 20 is herein referred to as enabled when first tuning element, capacitor 28, and second tuning element, inductor 30, are connected to matching circuit 20 in accordance with FIG. 2.

As shown in FIG. 2, an electrical conductor 32 having a defined characteristic impedance and defined electrical length can be used to connect capacitor 28 to inductor 30. The actual length of conductor 32 is dependent on the operating range of frequencies used by radio 10 and the electrical characteristics of the conduction medium. In the preferred embodiment of the present invention the electrical length of conductor 32 is one half wavelength. As is well understood in the art, the impedance presented at half a wavelength along a conductor, or multiples of a half wavelength, is the same as that presented at approximately a zero wavelength. In other words, when capacitor 28 is connected to half wavelength conductor 32 at point B, the effect of the electrical impedance at antenna interconnect 22 is the same as if capacitor 28 was connected directly to inductor 30 at point A. Therefore, conductor 32 permits matching circuit 20 to be tuned as if capacitor 28 is in close electrical proximity to inductor 30, while allowing capacitor 28 to be physically remote.

When test port 12 is used, 50 ohm test equipment, referred to herein as an external device or devices, may be connected to measure such electrical characteristics as the transmitter power, receiver sensitivity, or the impedance of duplexer 18. In the preferred embodiment of the present invention, test port 12 is located generally at the opposite end of radio transceiver 10 from inductor 30 and antenna 24. For reasons to be described below, it is preferable that first tuning element 28 be located near test port 12 so that a connection to first tuning element 28 can be mechanically linked to test port 12. Since conductor 32 electrically connects first tuning element 28 to a remotely located second tuning element 30, test port 12 can be optimally located for manufacturing convenience without regard to the location of inductor 30 or antenna 24.

When external devices are not connected to test port 12, a switch 34 is used to connect capacitor 28 to conductor 32. This enables matching circuit 20, as noted above. The connection of an external device at test port 12 causes a responsive movement of a switch drive 36 which operates, and opens switch 34. Switch drive 36 is schematically depicted in the figures as a dotted line linking test port 12 with switch 34. Preferably switch 34 is operated by a switch drive 36 that is mechanically linked to test port 12, however, switch drive 36 may alternately be an electrical signal. An example of a suitable switch 34 for this purpose would be one designed to be an integral unit with the connector of test port 12, so that the process of mating of an external device to the connector mechanically changes the electrical connection from one switch contact to another. A specific example of such a switch is part number S138W-SHD-16P, manufactured by Hirose Electric Co. Ltd. of Japan.

FIGS. 1 and 2 depict matching circuit 20 as a three terminal device. The first terminal of matching circuit 20 is connected to antenna interconnect 22, the second terminal is connected to antenna 24, and the third terminal is connected to test port 12. The first terminal of matching circuit 20 is connected to inductor 30 and conductor 32 at point A. The third terminal of matching circuit 20 is connected to the other end of conductor 32 and capacitor 28 at point B so that the first and third terminals of matching circuit 20 are operatively connected through conductor 32. The second terminal of matching circuit 20 is connected to the other end of inductor 30 at point C so that the first and second terminals of matching circuit 20 are operatively connected through inductor 30.

Test port 12 interfaces radio 10 to external devices when matching circuit 20 is disabled. What is meant by disabling matching circuit 20 is the effective removal of matching circuit 20 from the impedance path between test port 12 and antenna interconnect 22. This is done by operatively disconnecting the first tuning element 28 and second tuning element 30 from antenna connect 22. When matching circuit 20 is disabled, antenna interconnect 22 is interfaced only to test port 12. Therefore, the impedance at test port 12 is that of antenna interconnect 22, i.e., 50 ohms. As mentioned above, capacitor 28 is disconnected from antenna interconnect 22 when an external device is connected to test port 12. The means for disconnecting inductor 30 is described below.

As is well understood in the art, antenna 24 must be disconnected or removed from any operative connection to antenna interconnect 22 if external devices are to reliably communicate to radio 10 through test port 12. This is because leakage from antenna 24 through the air creates an alternate signal path to the external device from the intended path through test port 12. The arrival of the same signal at a different times to an external device typically causes communication errors. In the present invention, the removal of antenna 24, in preparation of using test port 12, substantially disconnects inductor 30 from antenna interconnect 22, as is illustrated in FIG. 2a. Conceptually, inductor 30 can be disconnected from antenna interconnect 22 by means of an imaginary switch 38. As measured from antenna interconnect 22, the impedance seen looking into switch 38 in the open position is infinite. That is, open switch 38, inductor 30, and antenna 24 have no effect upon the impedance matched to antenna interconnect 22. Substantially the same effect can be created by setting switch 38 to the closed position, so that antenna interconnect 22 and inductor 30 are connected, and opening an imaginary switch 40 so that inductor 30 and antenna 24 are disconnected. The opening and closing of switch 40 is a simulation of the act of physically disconnecting and connecting antenna 24 with matching circuit 20. Thus, the disconnecting of antenna 24 from matching circuit 20 substantially disconnects inductor 30 from antenna interconnect 22, providing a convenient means of at least partially disabling matching circuit 20. Matching circuit 20 is, therefore, completely disabled by disconnecting antenna 24 from radio 10 and connecting an external device to test port 12.

It is assumed and understood that antenna 24 is removed, or a suitable switch 38 or 40 is opened to effectively remove the antenna 24, whenever matching circuit 20 is disabled. Thus, when an external device is plugged into test port 12 and switch 34 is opened to disconnect capacitor 28 from matching circuit 20, matching circuit 20 is partially disabled. Matching circuit 20 is completely disabled when, additionally, antenna 24 is disconnected, or effectively disconnected from matching circuit 20.

FIG. 3 is a schematic drawing of an alternative embodiment of matching circuit 20 shown in FIG. 2, in which switch 34 selectively connects capacitor 28 to conductor 32 and selectively disconnects test port 12 from conductor 32 when no external device is engaged with test port 12. When an external device is connected to test port 12, switch 34 disconnects capacitor 28 from conductor 32 and connects test port 12 to conductor 32. As a further option, switch drive 36 can be supplied by an external source controlled by the user, such as a toggle switch mounted outside radio 10.

Figure 4:
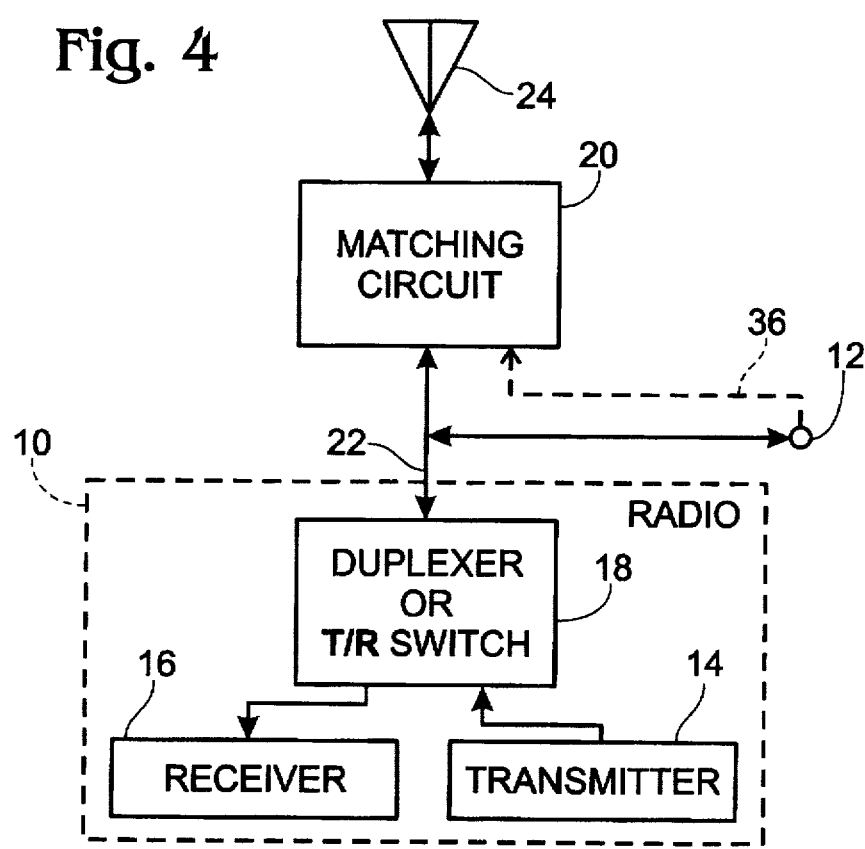
FIG. 4 is a block diagram of an alternate embodiment of the radio transceiver with a test port of FIG. 1, in which the test port is connected to the radio in parallel to the matching circuit.
Figure 5:
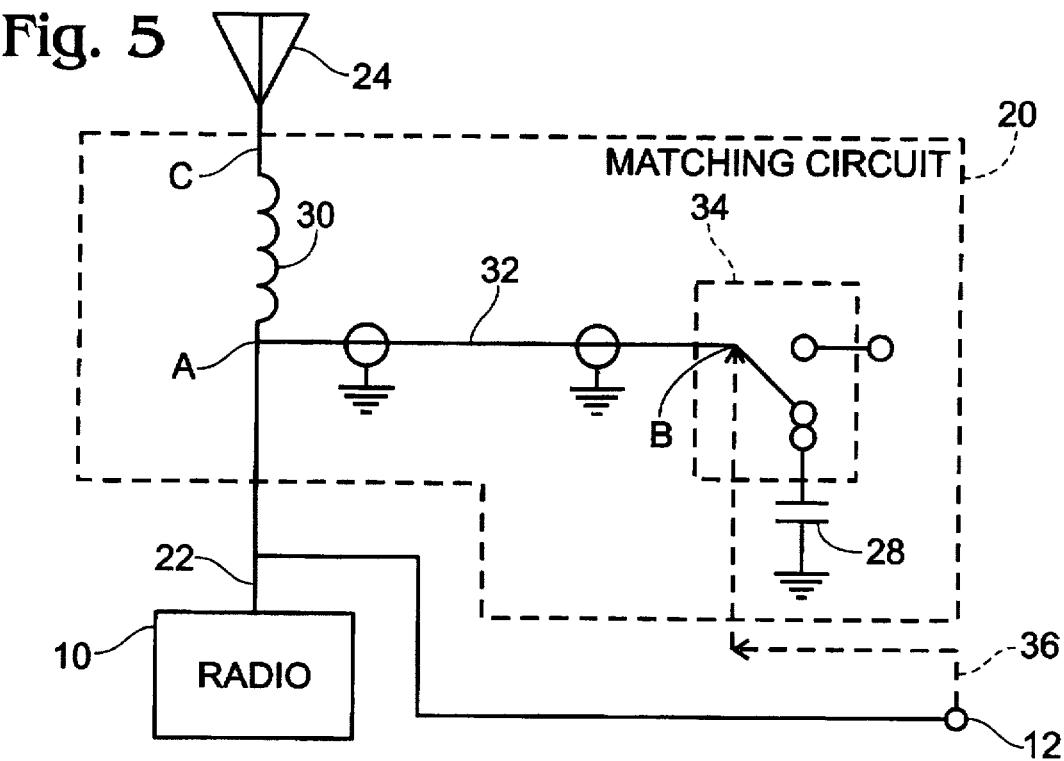
FIG. 5 is a schematic drawing of a matching circuit of the radio transceiver with test port shown in FIG. 4.

FIGS. 4 and 5 illustrate another alternate embodiment of the radio transceiver with a test port as shown in FIG. 1, the same reference numbers being repeated for like elements. In FIGS. 4 and 5 antenna 24 is selectively interfaced to antenna interconnect 22 through matching circuit 20, while test port 12 is connected directly to antenna interconnect 22. That is, matching circuit 20 is a two terminal device, and test port 12 is connected to antenna interconnect 22 in parallel with matching circuit 20.

FIG. 5 is a schematic drawing of matching circuit 20 shown in FIG. 4. Matching circuit 20 is connected to inductor 30, conductor 32, and antenna interconnect 22 at point A. The other end of conductor 32 is connected to capacitor 28 at point B so that the capacitor is operatively connected to point A of matching circuit 20 through conductor 32. Matching circuit 20 is connected to the other end of inductor 30 and antenna 24 at point C so that antenna 24 is operatively connected to point A of matching circuit 20 through inductor 30. Matching circuit 20 is disabled by disconnecting capacitor 28 from conductor 32 with switch 34, and operatively disconnecting inductor 30 from antenna interconnect 22.

FIG. 6 is a more detailed drawing of a suitable antenna 24, substantially illustrated in FIG. 1, in which antenna 24 has a plurality of selectable orientations. Matching circuit 20 is matching circuit 20 of FIGS. 2, 4, or 5. Matching circuit 20 is connected to antenna 24 through matching circuit interconnect 42. Antenna 24 is depicted as having three selectable orientations. In the first orientation matching circuit interconnect 42 is connected to an antenna first contact 44. In the first orientation a radiating element 46 is substantially inside a radio transceiver case 48 so as to minimize the size and profile of antenna 24 for increased portability. In the second orientation antenna 24 is manipulated so that matching circuit interconnect 42 is connected to an antenna second contact 50. In the second orientation antenna 24 is substantially located outside case 48 for the maximum gain of antenna 24. Antenna 24 is designed so that the impedance presented to matching circuit interconnect 42 is equivalent in both the first and second orientations. In this manner, matching circuit 20 transforms the impedance of antenna 24 to match that of antenna interconnect 22 in either antenna orientation.

Still referring to FIG. 6, in a third orientation antenna 24 is manipulated so that matching circuit interconnect 42 is connected to an antenna third contact 52. Antenna third contact 52 is an electrical insulator so that antenna 24 is disconnected from matching circuit 20. Antenna third contact 52 allows for the rapid disconnection of antenna 24 from matching circuit 20 which is desirable when test port 12 is to be used. Antenna third contact 52 is located at any convenient location along antenna 24. Antenna third contact 52 is alternately just an air gap between antenna 24 and matching circuit interconnect 42 when neither the first nor second antenna orientations are selected.

The present invention possesses several advantages over prior art devices. The present device allows a portable radio to be built and tested with an economical test port. A test port permits more precise testing of the radio than is possible with just an antenna link. The unique test port design of the present invention permits the optional use of a test port without additional insertion loss between the radio and the antenna. The design permits the test port to be located at the bottom of the radio case, or wherever is convenient, for easy test hookup. Further, the present invention can be implemented into a radio transceiver with only a small number of inexpensive parts. There is no requirement in the present invention for expensive 50 ohm antennas or RF switches. The test port is quickly accessed since the connection of an external device to the test port at least partially disconnects the antenna matching circuit. The matching circuit can be further disabled by a simple disconnect of the antenna from the radio transceiver. The test port can alternately be used to add performance enhancement options to the radio, such as transmitter power amplifiers and low noise receivers to increase sensitivity. Further, the use of a test port allows the radio to be selectively connected to directional, high gain, or remotely located antennas instead of the standard antenna.

The present invention is not limited to the conductor having an electrical wavelength of multiples of one half. Alternate embodiments of the invention permit the wavelength of the conductor to be other than an integral multiple of one half so that the conductor is a series tuning element of the matching circuit as is well known in the art. Alternate embodiments of the present invention also permit the conductor to be an impedance other than the system impedance, typically 50 ohms, so that the conductor is a tuning element of the matching circuit as is well known in the art.

The present invention is not necessarily limited to "L" type matching circuits, other types of RF impedance matches are also possible for use in the matching circuit. "Pi" and multiple stage "L" matching networks, as are well known in the art, are within the scope of the present invention. Likewise, various tuning elements such as capacitors, inductors and resistors, in series or shunt connection with the present tuning elements, may be used in the matching circuit. Further, the present invention is not necessarily limited to the use of a capacitor as the first element or an inductor as the second element. For example, the first tuning element could be an inductor and the second tuning element could be a capacitor.

The present invention is not limited to an antenna with just selectable orientations. Instead, antennas having a variety of different shapes, sizes, and gains are suitable for use with the radio of the present invention.

What is claimed is:

1. A radio transceiver for sending and receiving signals, with an antenna interconnect having a first impedance, the radio transceiver comprising:

a) a selectively enabled matching circuit operatively connected to the antenna interconnect, for transforming the impedance of an external antenna having a second impedance to match the first impedance;

b) a test port operatively connected to the antenna interconnect;

c) at least a first tuning element which is operatively connected to said matching circuit to enable said matching circuit when no external device is connected to said test port, said first tuning element being operatively disconnected from said matching circuit to disable said matching circuit when an external device is connected to said test port, the impedance of said test port matching the first impedance whenever said matching circuit is disabled, whereby external devices having impedances that match the first impedance are selectively connectable to said test port.

2. A radio transceiver as in claim 1, in which said at least first tuning element is a plurality of tuning elements, said matching circuit including a second tuning element operatively connecting the antenna interconnect to said antenna, said matching circuit being disabled when said second tuning element is operatively disconnected from the antenna interconnect and an external device is connected to said test port.

3. A radio transceiver as in claim 2, in which said matching circuit is disabled when the antenna is disconnected from said second tuning element and an external device is connected to said test port, whereby disconnecting the antenna from said second tuning element provides substantially the same impedance characteristics to the antenna interconnect as disconnecting said second tuning element from the antenna interconnect.

4. A radio transceiver as in claim 3, having an operating range of frequencies, and in which said matching circuit includes a third tuning element having a characteristic impedance and an electrical length, said first tuning element operatively connected to said second tuning element with said third tuning element.

5. A radio transceiver as in claim 4, in which the electrical length of said third tuning element is one of a plurality of wavelengths that is any integral multiple of approximately one half, whereby said matching circuit impedance characteristics are substantially the same as said third tuning element having an electrical wavelength of approximately zero.

6. A radio transceiver as in claim 5, in which said first tuning element is operatively connected to said third tuning element through a switch when said test port is not connected to an external device, and said first tuning element is operatively disconnected from said third tuning element with said switch when said test port is connected to an external device.

7. A radio transceiver as in claim 6, in which the first impedance is approximately 50 ohms and the characteristic impedance of said third tuning element is approximately 50 ohms.

8. A radio transceiver as in claim 7, in which said first tuning element is a capacitor, said second tuning element is an inductor, and said third tuning element is an electrically conductive wire.

9. A radio transceiver as in claim 8, further including a test port connector adapted to engage a connector of an external device, said test port connector and said switch forming an integral unit in which said switch is operated by mating the external device connector with said test port connector.

10. A radio transceiver for sending and receiving signals having an antenna interconnect with a first impedance, and comprising:
   a) an antenna operatively connected to the antenna interconnect, said antenna having a second impedance different from the first impedance;
   b) a matching circuit with at least three terminals and having at least a first tuning element, the first terminal of said matching circuit operatively connected to the antenna interconnect, and the second terminal of said matching circuit operatively connected to said antenna;
   c) a test port operatively connected to said matching circuit third terminal to selectively connect external devices to said antenna interconnect; and
   d) said first tuning element located adjacent said test port and operatively connected to said matching circuit first terminal for transforming a second impedance to match a first impedance when no external device is connected to said test port, said first tuning element operatively disconnected from said matching circuit first terminal to disable said matching network when an external device is connected to said test port, said test port impedance matching the first impedance whenever said matching circuit is disabled.

11. A radio transceiver as in claim 10, in which said matching circuit further includes a second tuning element operatively connecting said matching circuit first and second terminals, said matching circuit being disabled when said second tuning element is operatively disconnected from said matching circuit first terminal and an external device is connected to said test port.

12. A radio transceiver as in claim 11, in which said matching circuit is disabled when said antenna is disconnected from said matching circuit second terminal and an external device is connected to said test port, whereby disconnecting said antenna from said matching circuit second terminal substantially disconnects said second tuning element from said matching circuit.

13. A radio transceiver as in claim 12, having an operating range of frequencies, in which an electrical conductor having a characteristic impedance operatively connects said first tuning element to said second tuning element, said electrical conductor having an electrical length that is one of a plurality of wavelengths that is an integral multiple of approximately one half, whereby the electrical tuning characteristics of said first tuning element in said matching circuit are substantially the same as placing said first tuning element an electrical wavelength of approximately zero wavelengths from said second tuning element.

14. A radio transceiver as in claim 13, in which the electrical length of said electrical conductor is one of a plurality of wavelengths that is not an integral multiple of approximately one half, whereby said conductor is a third tuning element in said matching circuit.

15. A radio transceiver as in claim 14, in which said first tuning element is a capacitor and said second tuning element is an inductor.

16. A radio transceiver as in claim 15, further including a switch, said capacitor operatively connected to said electrical conductor through said switch when said test port is not connected to an external device, and said capacitor operatively disconnected from said connector by said switch when said test port is connected to an external device.

17. A radio transceiver as in claim 16, further including a test port connector adapted to engage a connector of an external device, said test port connector and said switch forming an integral unit in which said switch is operated by mating the external device connector with said test port connector.

18. A radio transceiver as in claim 17, in which the first impedance is approximately 50 ohms and the characteristic impedance of said electrical conductor is approximately 50 ohms.

19. A radio transceiver as in claim 18, in which the radio transceiver has a case and said antenna has at least two selectable orientations with equivalent impedances, said antenna first orientation substantially inside said case to provide a minimal antenna size, and said antenna second orientation substantially outside the case to provide maximum antenna gain.

20. An radio transceiver as in claim 18, in which said antenna is one of a plurality of selectable antennas with equivalent impedances.

\* \* \* \* \*